US006053098A

United States Patent [19]

Yamamoto

[11] Patent Number: 6,053,098

[45] Date of Patent: Apr. 25, 2000

[54] ROTARY ROOT VEGETABLE SLICER

[75] Inventor: Hajime Yamamoto, Iwakuni, Japan

[73] Assignee: Benriner Co., Ltd., Yamaguchi, Japan

[21] Appl. No.: 09/398,227

[22] Filed: Sep. 17, 1999

[51] Int. Cl.[7] .............................. A47J 17/00; A47J 17/04; A47J 43/28; A23N 7/00; B26D 3/11

[52] U.S. Cl. ................................ 99/538; 99/537; 99/594; 99/595; 83/425.1; 83/733; 83/865; 83/932

[58] Field of Search ..................... 99/538, 537, 539–541, 99/584, 588–599; 426/481, 482, 483; 30/113.1, 114, 300; 82/173; 83/875, 865, 165, 625, 402, 436, 409.2, 437.2, 437.4, 356.1, 356.3, 420, 425.1, 733, 932

[56] References Cited

U.S. PATENT DOCUMENTS

| | | | |
|---|---|---|---|
| 969,979 | 9/1910 | Randolph | 99/594 X |
| 2,464,993 | 3/1949 | Ross | 99/595 X |
| 3,211,202 | 10/1965 | Mason | 99/537 X |
| 4,581,990 | 4/1986 | Matsumoto | 99/538 |
| 4,619,192 | 10/1986 | Cycyk et al. | 99/538 |
| 4,628,808 | 12/1986 | Simon | 99/538 |
| 4,753,159 | 6/1988 | Eaton | 99/594 X |
| 4,765,234 | 8/1988 | Cailliot | 99/594 X |
| 4,926,726 | 5/1990 | Julian | 83/865 X |
| 4,979,418 | 12/1990 | Covert et al. | 83/932 X |
| 5,097,735 | 3/1992 | Mendenhall | 83/865 X |
| 5,211,098 | 5/1993 | Mendenhall | 83/932 X |
| 5,950,528 | 9/1999 | Wang | 99/595 X |

*Primary Examiner*—Timothy Simone

*Attorney, Agent, or Firm*—Fattibene & Fattibene; Paul A. Fattibene; Arthur T. Fattibene

[57] ABSTRACT

A rotary root vegetable slicer that is reliably held at an installed position even when water enters into the lower surface of the bed plate, and can be easily removed from the installed position. The rotary root vegetable slicer (1) includes a bed plate (2) of a nearly square shape as viewed on a plane, a blade-mounting member (5) erected at an end of the bed plate (2) for detachably mounting a plane blade (3) and a comb blade (4), a rotary piece-mounting member (6 ) on a portion on the other side of the bed plate (2) opposed to the blade-mounting member (5) so as to slide along the lengthwise direction of the bed plate (2), and a rotary piece (8) having many needle-like protrusions (7) arranged on the front surface thereof at an upper part of the rotary piece-mounting member (6) so as to rotate. Protuberances (12) are formed on the lower surface (11) of the bed plate (2) at both ends on the side of the blade-mounting member (5), and anti-slip pieces (19) made of a natural rubber are fitted to the protuberances (12). Even when water enters into the lower surface (11) of the bed plate (2) while the rotary root vegetable slicer (1) is being used, a sufficiently large frictional force is maintained owing to the natural rubber forming the anti-slip pieces (19), and the rotary root vegetable slicer (1) is held on the installation surface (15). Since the anti-slip pieces (19) have not been adsorbed, the rotary root vegetable slicer (1) can be easily removed.

1 Claim, 5 Drawing Sheets

ROTARY ROOT VEGETABLE SLICER

BACKGROUND OF THE INVENTION

1. Field of the Invention

The present invention relates to a rotary root vegetable slicer. More particularly, the invention relates to a rotary root vegetable slicer for slicing root vegetables such as radish, carrot, potato, onion, cucumber, lotus root, cabbage and the like vegetables by a plane blade and a comb blade while rotationally moving the root vegetables.

2. Description of the Prior Art

A conventional rotary root vegetable slicer of this type will be described with reference to FIG. 5, wherein reference numeral 1 denotes a rotary root vegetable slicer having a bed plate 2 of nearly a square shape as viewed on a plane. A blade-mounting member 5 is erected at an end of the bed plate 2 for detachably mounting a plane blade 3 and a comb blade 4. On a portion on the other side of the bed plate 2, there is provided a rotary piece-mounting member 6 being opposed to the blade-mounting member 5 and so as to slide along the lengthwise direction of the bed plate 2. A rotary piece 8 having a number of needle-like protrusions 7 on the front surface thereof is disposed on an upper part of the rotary piece-mounting member 6 so as to rotate. The blade-mounting member 5 has an engaging piece 9 protruded in concentric with the rotary piece 8, and the rotary piece-mounting member 6 is provided with a handle 10 for turning the rotary piece 8. The bed plate 2, blade-mounting member 5, rotary piece-mounting member 6 and rotary piece 8 are obtained by injection-molding a synthetic resin.

Protuberances 12, 12 are formed on the lower surface 11 of the bed plate 2 at both ends on the side of the blade-mounting member 5, and sucking disks 13, 13 made of a soft synthetic resin or the like material are fitted to the protuberances 12 and 12. Further, legs 14, 14 are provided on the lower surface 11 of the bed plate 2 at both ends on the side opposite to the blade-mounting member 5, the legs 14, 14 being injection-molded simultaneously with the bed plate 2.

To use the rotary root vegetable slicer 1, the bed plate 2 is installed on the installation surface 15 and is secured by being sucked by the instillation surface 15 by utilizing the suction disks 13 and 13. Then, the rotary piece-mounting member 6 is slid up to an end of the bed plate 2. An end of the root vegetable 16 is pressed forcibly onto to the needle-like protrusions 7, the rotary piece-mounting member 6 is slid toward the blade-mounting member 5, and the engaging piece 9 provided on the blade-mounting member 5 is driven into the end of the root vegetable 16 and is anchored therein. Then, the handle 10 is turned and the rotary piece-mounting member 6 is slid in the lengthwise direction of the bed plate 2, so that the root vegetable 16 is rotated with the center of the engaging piece 9 on one side and the center of the rotary piece 8 on the other side as a center of rotation and is sliced and shredded.

The rotary root vegetable slicer 1 of this type is usually used in kitchen or in a place where water is frequently used. Therefore, water adheres to the sucking disks 13 and 13 and often infiltrates to the lower surface of the sucking disks 13 and 13 causing the sucking disks 13 and 13 to lose sucking force. Hence, the bed plate 2 undesirably moves to impair the operation for slicing the root vegetable.

To remove the rotary root vegetable slicer 1 from the place on where it is installed, furthermore, the sucking force of the sucking disks 13 and 13 must be canceled and the rotary root vegetable slicer 1 must be removed from the installation surface 15 involving difficulty.

Thus, there arouse technical problems that must be solved in order to reliably hold the rotary root vegetable slicer 1 at an installation position despite water infiltrates into the lower surface 11 of the bed plate 2 of the rotary root vegetable slicer 1 and to easily remove the rotary root vegetable slicer 1 from the place where it is installed after it is used. The object of the present invention is to solve these problems.

SUMMARY OF THE INVENTION

The present invention was proposed in order to accomplish the above-mentioned object, and provides a rotary root vegetable slicer in which a blade-mounting member formed by the injection-molding of a synthetic resin and is detachably mounting a plane blade and a comb blade is erected on an end of a bed plate formed by the injection molding of the synthetic resin, a rotary piece-mounting member formed by the injection-molding of the synthetic resin is provided on a portion on the other side of said bed plate being opposed to said blade-mounting member so as to slide along the lengthwise direction of said bed plate, and a rotary piece having many needle-like protrusions arranged on the front surface thereof is disposed on an upper part of said rotary piece-mounting member so as to rotate, wherein recessed portions are formed in the lower surface of said bed plate at both ends on the side of said blade-mounting member, anti-slip pieces having nearly an inverse T-shape as viewed from the front made of a natural rubber are provided, and vertical pieces of said anti-slip pieces are fitted into said recessed portions so that said anti-slip pieces are fitted to the lower surface of said bed plate.

DESCRIPTION OF THE PREFERRED EMBODIMENT

Figure 1:
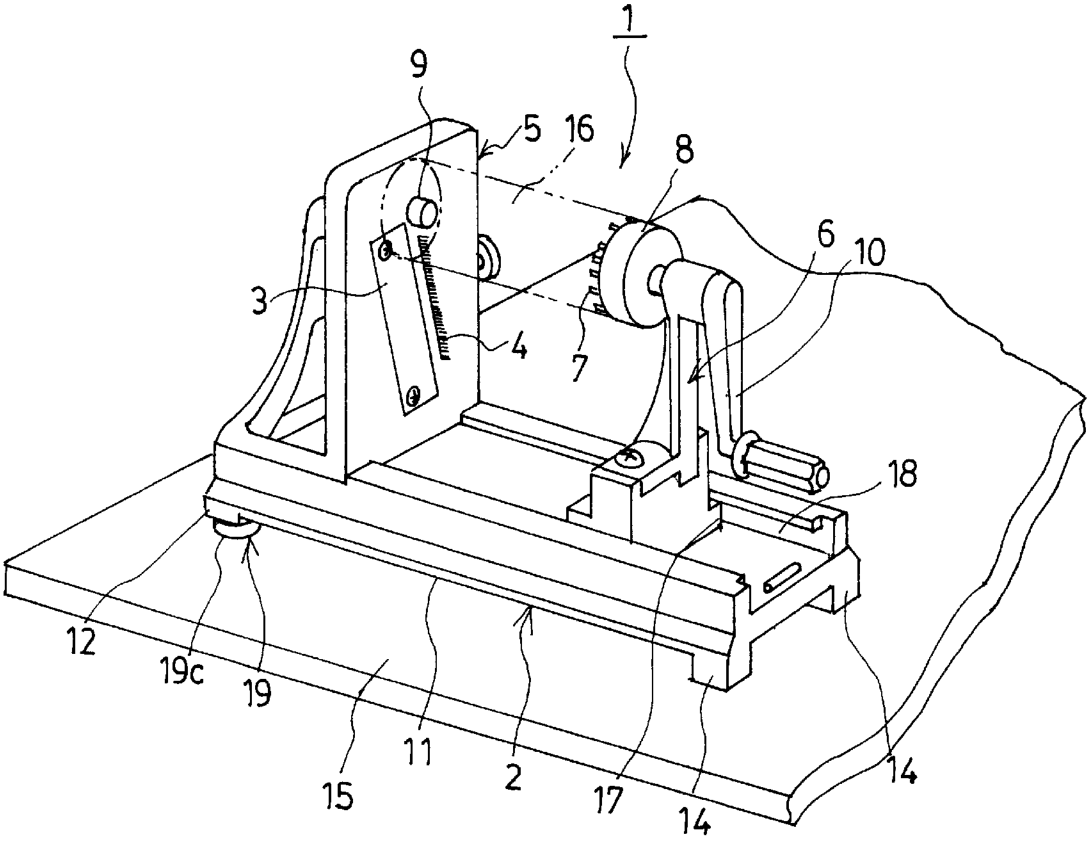
FIG. 1 is a perspective view of a rotary root vegetable slicer according to an embodiment of the present invention.
Figure 2:
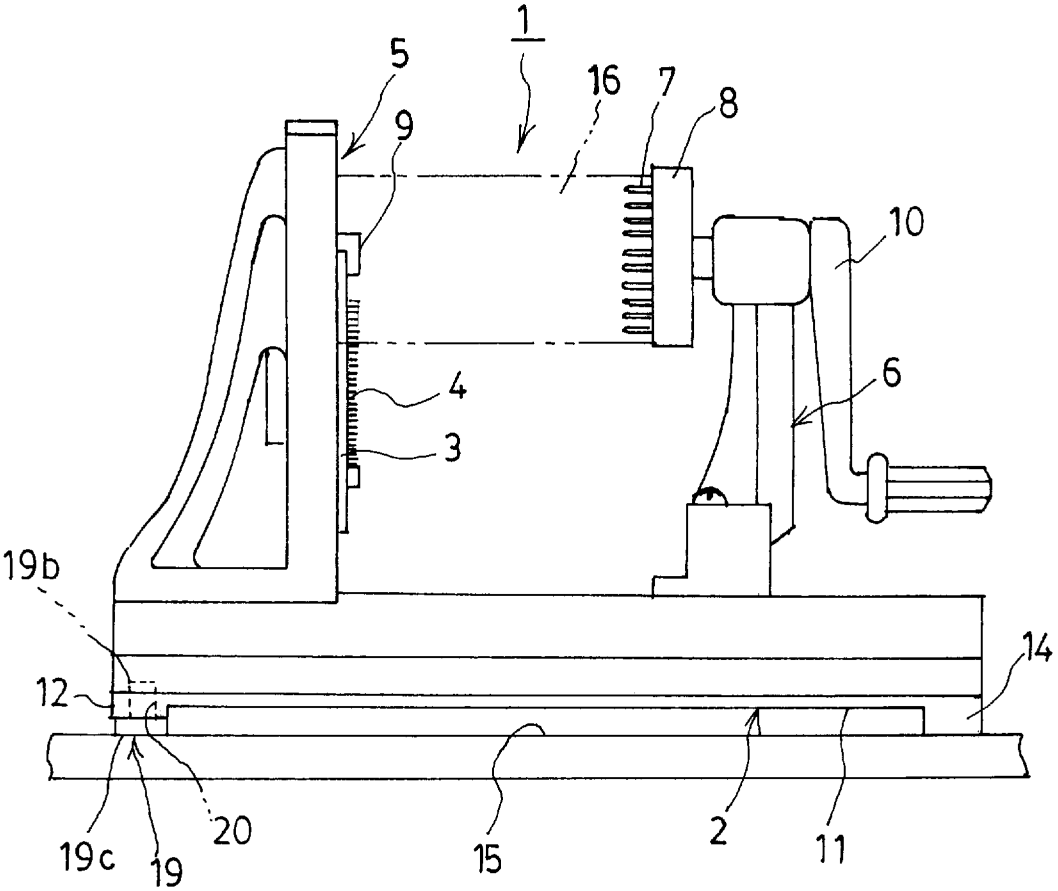
FIG. 2 is a side view of the rotary root vegetable slicer according to the embodiment of the present invention.
Figure 3:
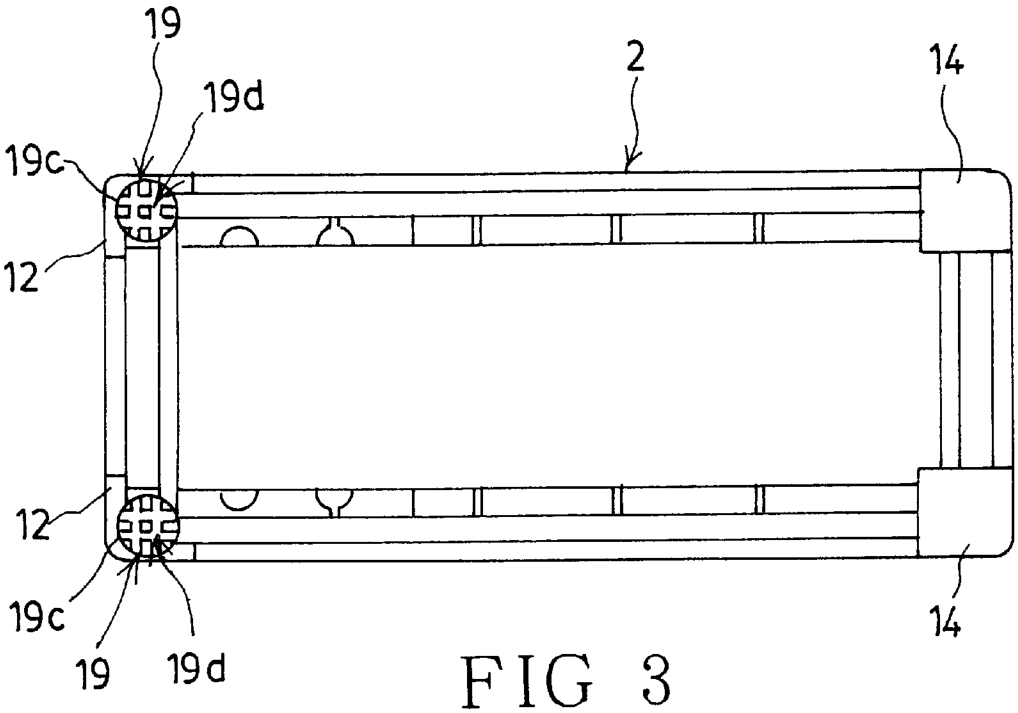
FIG. 3 is a bottom view of the rotary root vegetable slicer according to the embodiment of the present invention.

An embodiment of the present invention will now be described in detail with reference to FIGS. 1 to 4. Here, for easy explanation, the constitutions same as those of the prior art are denoted by the same reference numerals. In FIGS. 1 to 3, reference numeral 1 denotes a rotary root vegetable slicer having a bed plate 2 of nearly a square shape as viewed on a plane. A blade-mounting member 5 for detachably mounting a plane blade 3 and a comb blade 4 is erected at an end of the bed plate 2. On the other side of the bed plate 2, there is provided a rotary piece-mounting member 6 being opposed to the blade-mounting member 5 and being allowed to slide along the lengthwise direction of the bed plate 2. A rotary piece 8 having many needle-like protrusions 7 arranged on the front surface thereof is disposed at an upper portion of the rotary piece-mounting member 6 so as to rotate.

An engaging piece 9 is protruded on the blade-mounting member 5 in concentric with the rotary piece 8. The rotary piece-mounting member 6 is provided with a handle 10 for rotating the rotary piece 8, and protuberances 17 and 17 are formed on the lower portions of the rotary piece-mounting member 6 at both ends thereof. In the bed plate 2 are formed guide portions 18 and 18 for guiding the protuberances 17 and 17 along the lengthwise direction of the bed plate 2. The bed plate 2, blade-mounting member 5, rotary piece-mounting member 6 and rotary piece 8 are formed by injection-molding a synthetic resin.

Figure 4:
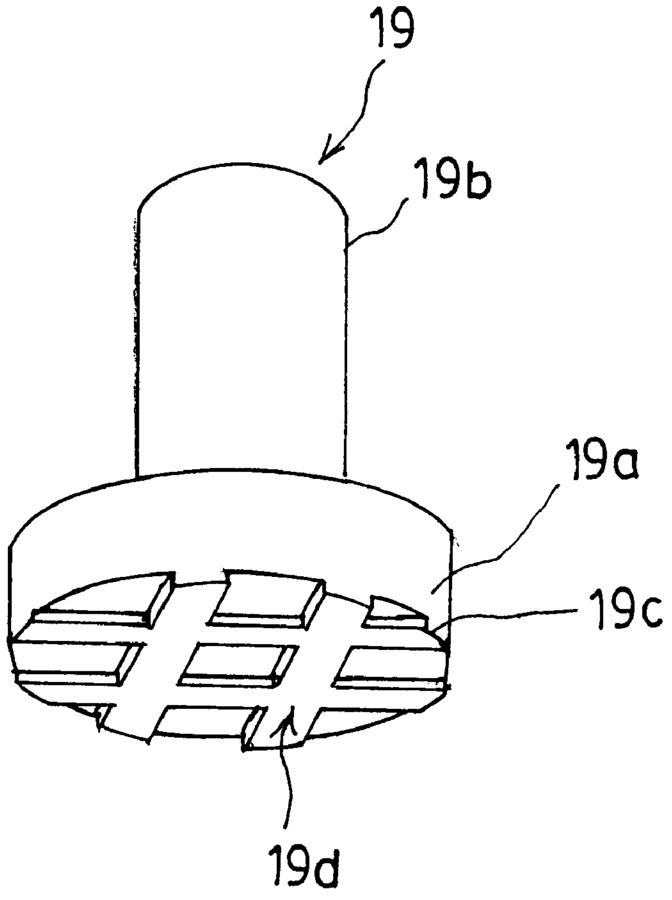
FIG. 4 is a perspective view illustrating, on an enlarged scale, the anti-slip piece of the rotary root vegetable slicer shown in FIG. 1.
Figure 5:
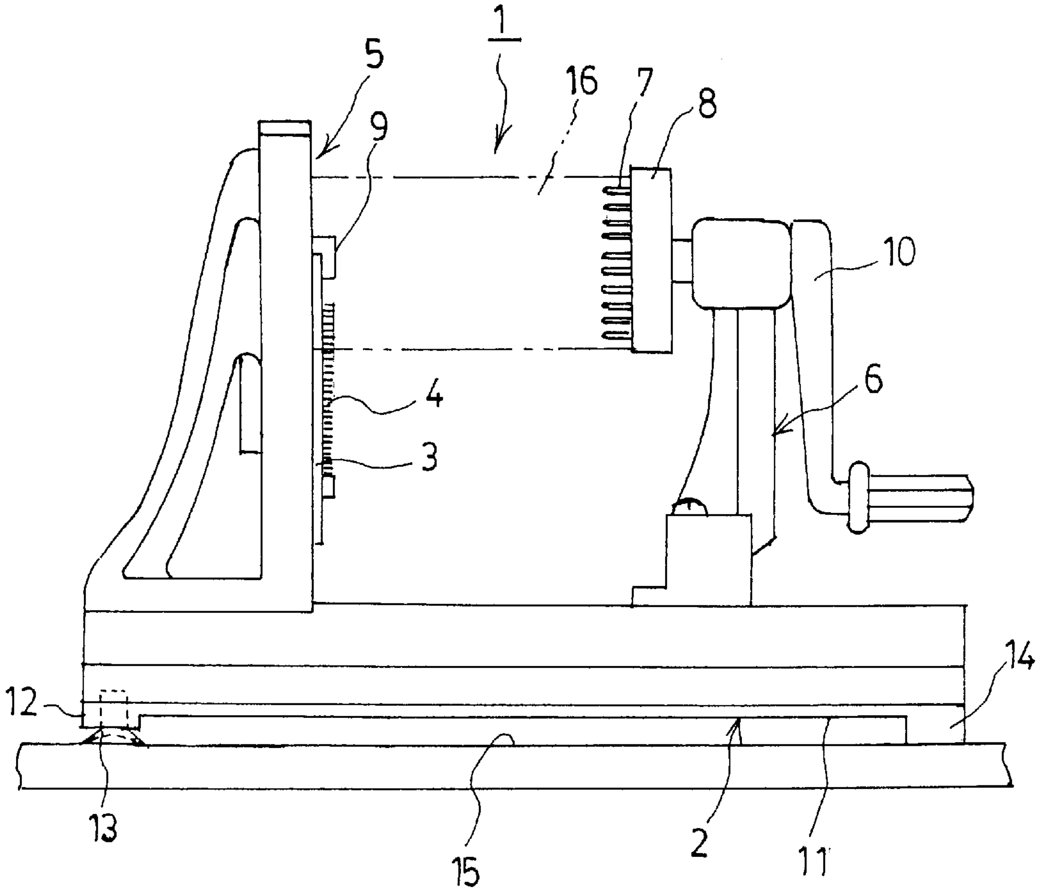
FIG 5 Prior Art
FIG. 5 is a side view of a rotary root vegetable slicer according to a prior art.

Further, protuberances 12 and 12 are formed on the lower surface 11 of the bed plate 2 at both ends thereof on the side of the blade-mounting member 5. Anti-slip pieces 19 and 19 are fitted to the protuberances 12 and 12. Referring to FIG. 2, recessed portions 20 and 20 are formed in the lower surface of the protuberances 12 and 12. Referring to FIG. 4, the anti-slip pieces 19 and 19 are formed in nearly an inverse T-shape as viewed from the front and are entirely formed of a natural rubber, and are constituted by a main portion 19*a*, 19*a* and a vertical piece 19*b*, 19*b*. Further, anti-slipping rugged patterns 19*d*, 19*d* are formed in the bottom surface 19*c*, 19*c* of the main portion 19*a*, 19*a*. Upon fitting the vertical pieces 19*b* and 19*b* into the recessed portions 20 and 20, the anti-slip pieces 19 and 19 are fitted to the bed plate 2.

Legs 14 and 14 are provided on the lower surface 11 of the bed plate 2 at both ends thereof on the side opposite to the blade-mounting member 5, the legs 14 and 14 being injection-molded simultaneously with the bed plate 2.

To use the rotary root vegetable slicer 1, the bed plate 2 is installed on the installation surface 15, and the rotary piece-mounting member 6 is slid up to an end of the bed plate 2. An end of the root vegetable 16 is pressed forcibly onto the needle-like protrusions 7, the rotary piece-mounting member 6 is slid toward the blade-mounting member 5, and the engaging piece 9 provided on the blade-mounting member 5 is driven into the end of the root vegetable 16 thereby to secure the root vegetable 16 between the engaging piece 9 and the rotary piece 8. Then, the handle 10 is turned and the rotary piece-mounting member 6 is slid in the lengthwise direction of the bed plate 2, so that the root vegetable 16 is rotated with the center of the engaging piece 9 on one side and the center of the rotary piece 8 on the other side as a center of rotation and is sliced and shredded.

The rotary root vegetable slicer 1 that is being used is reliably held on the installation surface 15 owing to the frictional force of the natural rubber forming the anti-slip pieces 19 and 19 and the frictional force produced by the rugged patterns 19*d* and 19*d*. Even when water enters into the bottom surfaces 19*c* and 19*c* of the anti-slip pieces 19 and 19, a sufficiently large frictional force is maintained by the bottom surfaces 19*c* and 19*c* enabling the rotary root vegetable slicer 1 to be held on the installation surface 15. The rotary root vegetable slicer 1 can be easily removed from the installation surface 15 since the bottom surfaces 19*c* and 19*c* of the anti-slip pieces 19 and 19 have not been adsorbed by the installation surface 15 unlike that of the sucking disks of the prior art.

According to the present invention as described above in detail by way of an embodiment, recessed portions are formed in the lower surface of the bed plate of the rotary root vegetable slicer at both ends on the side of the blade-mounting member, anti-slip pieces having nearly an inverse T-shape as viewed from the front and made of a natural rubber are provided, and vertical pieces of the anti-slip pieces are fitted into the recessed portions so that the anti-slip pieces are mounted on the bed plate. Therefore, even if water infiltrates into the lower surface of the bed plate of the rotary root vegetable slicer that is being used, the frictional force is maintained to a sufficient degree by the natural rubber of the anti-slip pieces, and the rotary root vegetable slicer is reliably held at the installed position. Besides, the rotary root vegetable slicer can be easily removed from the installation surface since the anti-slip pieces have not been adsorbed by the installation surface, offering a great effect.

Here, it should be noted that the present invention can be modified in a variety of ways without departing from the spirit of the invention and that the invention encompasses the modified embodiments as a matter of course.

I claim:

1. A rotary root vegetable slicer in which a blade-mounting member formed by the injection-molding of a synthetic resin and is detachably mounting a plane blade and a comb blade is erected on an end of a bed plate formed by the injection molding of the synthetic resin, a rotary piece-mounting member formed by the injection-molding of the synthetic resin is provided on a portion on the other side of said bed plate being opposed to said blade-mounting member so as to slide along the lengthwise direction of said bed plate, and a rotary piece having many needle-like protrusions arranged on the front surface thereof is disposed on an upper part of said rotary piece-mounting member so as to rotate, wherein recessed portions are formed in the lower surface of said bed plate at both ends on the side of said blade-mounting member, anti-slip pieces having nearly an inverse T-shape as viewed from the front made of a natural rubber are provided, and vertical pieces of said anti-slip pieces are fitted into said recessed portions so that said anti-slip pieces are fitted to the lower surface of said bed plate.

* * * * *